Dec. 28, 1965 V. W. CIRRINCIONE 3,225,680
FILTER AND RETAINING DEVICE
Original Filed April 16, 1962
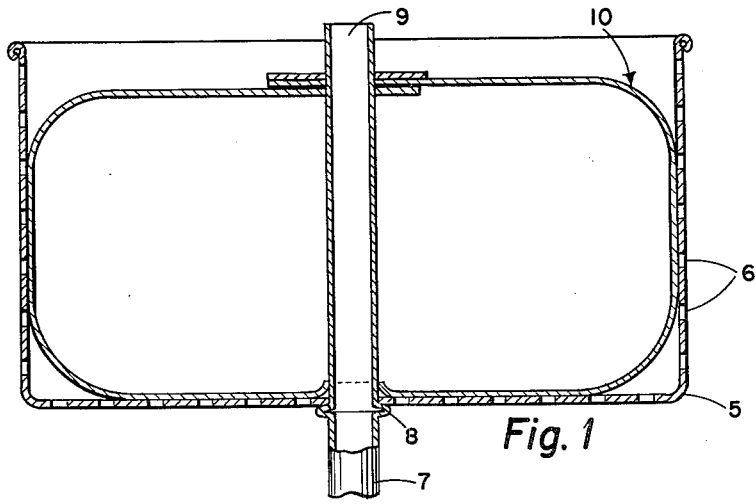
Fig. 1
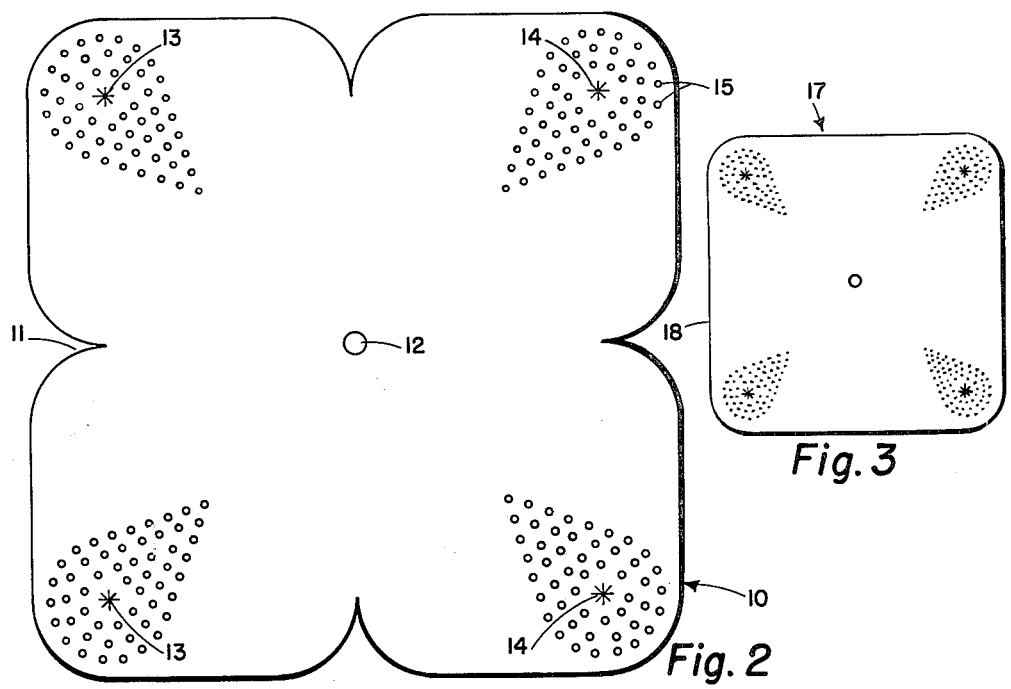
Fig. 2
Fig. 3
Fig. 4
INVENTOR.
VINCENT W. CIRRINCIONE
BY Harold C. Bayer
ATTORNEY 3,225,680
FILTER AND RETAINING DEVICE
Vincent W. Cirrincione, Rochester, N.Y., assignor to Andex Corp., Rochester, N.Y., a corporation of New York
Continuation of application Ser. No. 187,846, Apr. 16, 1962. This application Jan. 8, 1964, Ser. No. 340,580
2 Claims. (Cl. 99—312)

This application is a continuation of my application Serial No. 187,846, filed April 16, 1962, now abandoned.

This invention relates to filtering devices and more particularly to a filter and coffee ground retainer for use within a conventional household coffee percolator.

A primary object of this invention is to provide a disposable filter for use within the perforated coffee strainer of a conventional coffee percolator, which filter securely retains therein the coffee grounds during and after percolation.

A further object is to provide a filter composed of a material which possesses a high degree of wet strength and yet filters efficiently and effectively, so that coffee may be produced, having a desirable flavor, without containing any sediment or grounds.

A still further object of this invention is to provide a filter, of the type described, which can be easily installed in the perforated strainer of a conventional coffee percolator and which can be just as easily removed without rupturing after the percolation is complete.

A further object of this invention is to provide a filter, of the type described, which can be inexpensively manufactured.

Other objects and advantages of my invention will be set forth in the claims and will be apparent from the following description, when taken in connection with the accompanying drawings, in which:

FIGURE 1 is an elevational sectional view of the filter mounted in an operative position.

FIGURE 2 is a plan view of the filter.

FIGURE 3 is a plan view of a modified form of a filter.

FIGURE 4 is a plan view of a further modified form.

The device contemplated by this invention is preferably used in conjunction with a conventional coffee percolator, which is provided with a perforated container or strainer 5. The strainer 5 contains a plurality of perforations or holes 6. Although these holes 6 are relatively small, nevertheless a considerable number of coffee grounds and sedimentation may, in the normal course of operation, seep into the coffee storage pot normally located below the strainer 5. The coffee percolator is usually provided with a percolator tube 7, which is insertable into the strainer 5 and which supports the strainer 5 by means of a flange 8. The percolator tube 7 is, of course, hollow and has an open top 9, through which the percolating coffee is discharged.

The device contemplated by this invention constitutes a filter 10, which is preferably of a clover leaf design. The filter 10 is normally fabricated from a porous type of thin tissue, having a high degree of wet strength and capable of fast filter action. The filter 10 is provided with indentations 11 along each side thereof. It is further provided with a central opening 12 and apertures 13, located in each corner. The apertures 13 are formed by means of radial slits 14. The central opening 12 and the apertures 13 have the same approximate diameter as that of the percolator tube 7. In each corner of the filter 10, in the vicinity of the apertures 13, there is provided a multiplicity of tiny pin hole perforations 15.

In operation, the filter 10 is placed within the strainer 5 of a conventional percolator such that the tube 7 extends through the central opening 12. The desired quantity of coffee is placed within the strainer 5. The four corners of the filter 10 are then pulled upwardly and inwardly toward the free end 9 of the percolator tube 7, so that the apertures 13 may be threaded over the free end 9. A relatively secure enclosure is thereby provided for the coffee grounds contained within the strainer 5. It will then be noted that there is considerable overlapping of each edge of the filter 10, so as to prevent any seepage of coffee grounds outside of the enclosure so formed. Due to the fact that the filter 10 is fabricated of tissue which has a fairly constant porosity throughout, and since there is considerable overlapping of the edges of the filter 10 near the free end of the tube 7, it has been deemed advisable to provide the perforations 15. In this manner, the porosity of the enclosure so formed in the area of the overlapping is thereby increased. The precise location of the perforations 15 and the configuration of these perforations may be modified in numerous ways so as to produce various flavors and strengths of coffee. After the percolation of the coffee is deemed to be complete, the filter 10 is removed from the strainer 5. This may be accomplished quite easily, since the filter 10 is composed of a material having a high degree of wet strength. The removal of the enclosure is accomplished such that the coffee grounds contained therein remain in their confined position and are not spilled during the process. The filter 10 containing the used coffee grounds, retained in the enclosure so formed, as previously described, is then thrown away as is any other disposable item. The strainer 5 will be left in a relatively clean condition, such that little washing or rinsing is necessary. It will be discovered that the utilization of the filter 10 makes it possible to use a relatively fine grind of coffee. It is, of course, well recognized that with a finer grind of coffee, a greater quantity of coffee may be produced per pound or unit of weight of coffee grounds.

Although the apertures 13 are provided with radial slits 14, it should be recognized that these radial slits are not absolutely necessary to the operation of the device. The radial slits, of course, do provide for a tighter enclosure and tend to prevent seepage adjacent to the surface of the tube 7 in the vicinity of the free end 9 thereof. Furthermore, the central opening 12 could be provided with radial slits similar to the slits 14 in the apertures 13.

It is obvious that various configurations of filters can be provided. As shown in FIGURE 3, a modified form of filter 17 is provided. This filter is essentially the same as the filter 10, except that it is provided with straight sides 18.

A further modified form of filter is disclosed in FIGURE 4, which is also essentially the same as the filter shown in FIGURE 2. This modified form is provided with square corners 19. Clearly, there are many other possible configurations which would function in essentially the same manner as previously described. The particular configuration or shape of filter selected would depend upon the particular type of coffee percolator employed. However, the configuration disclosed in FIGURE 2 herein may be successfully used in most conventional coffee percolators.

Having thus described my invention, I claim:

1. A filter and coffee ground retainer device for installation within a coffee percolator having a strainer and a centrally located fluid delivery percolator tube therein consisting in its entirety of a sheet of porous filter material, said sheet having a high degree of wet strength and being foldable to define an enclosure capable of holding and retaining ground coffee which enclosure and ground coffee may be disposed of as a unit, said sheet having a smooth, flat planar surface throughout and being of substantially square configuration with an opening in the center thereof, each corner of said sheet terminating in a rounded edge portion to eliminate excess material from said sheet in forming said enclosure, each corner having an aperture formed therein spaced inwardly from said rounded edge towards said center opening, each of said corners provided with a multiplicity of pierced perforations surrounding said aperture with the greatest number of said perforations being between said aperture and center opening, said sheet being positionable within said strainer with said tube extending through said center opening, said corners being foldable towards said tube to form an enclosure for coffee grounds with said tube being threaded through said apertures and said corners overlapping one another with the rounded edge of one corner overlapping only a portion of the perforations between the aperture and the center opening of the diametrically opposite corner to improve the porosity of the overlapping portion of said sheet of material and permitting the ready passage therethrough of the fluid from said tube whereby a smooth and even distribution of the fluid is obtained over the coffee grounds in said enclosure.

2. A filter and coffee ground retainer device for installation within a coffee percolator having a strainer and a centrally located fluid delivery percolator tube therein consisting in its entirety of a sheet of porous filter material, said sheet having a high degree of wet strength and being foldable to define an enclosure capable of holding and retaining ground coffee which enclosure and ground coffee may be disposed of as a unit, said sheet being of substantially square configuration with an opening in the center thereof, each side edge of said sheet having an indentation provided in the center thereof to define a plurality of corner segments, each corner segment terminating in a rounded edge, each corner segment having an aperture formed therein spaced inwardly from said rounded edge towards said center opening, each of said corner segments provided with a multiplicity of perforations surrounding said aperture with the greatest number of said perforations being between said aperture and said center opening, said sheet being positionable within said strainer with said tube extending through said center opening, said corner segments being foldable towards said tube to form an enclosure for coffee grounds with said tube being threaded through said aperture and said corner segments overlapping one another with the rounded edge of one segment overlapping only a portion of the perforations between the aperture and the center opening of the diametrically opposite corner segment to improve the porosity of said sheet of material and permitting the ready passage through the perforations of the corner segments of the fluid from said tube whereby a smooth and even distribution of the fluid is obtained over the coffee grounds in said enclosure and said indentations and rounded corners eliminating excess portions of said sheet and providing for a neat and compact arrangement of said corner segments during the overlapping thereof.

References Cited by the Examiner

UNITED STATES PATENTS

| | | | |
|---|---|---|---|
| 1,352,232 | 9/1920 | Weightman et al. | 53—207 X |
| 1,481,757 | 1/1924 | Stokes | 53—207 X |
| 1,489,807 | 4/1924 | Anderson | 99—295 |
| 2,859,684 | 11/1958 | Polizzi | 210—496 X |
| 3,083,100 | 3/1963 | Baran | 99—312 X |

REUBEN FRIEDMAN, *Primary Examiner.*

HERBERT L. MARTIN, *Examiner.*

S. ZAHARNA, *Assistant Examiner.*